United States Patent [19]
Kawata et al.

[11] Patent Number: 5,091,670
[45] Date of Patent: Feb. 25, 1992

[54] ULTRASONIC MOTOR

[75] Inventors: Masayuki Kawata; Fujio Ozawa; Masao Kasuga; Minako Suzuki; Takako Shibayama, all of Tokyo, Japan

[73] Assignee: Seiko Instruments Inc., Japan

[21] Appl. No.: 537,358

[22] Filed: Jun. 13, 1990

[30] Foreign Application Priority Data

Jun. 19, 1989 [JP] Japan .................. 1-71908[U]
Jan. 22, 1990 [JP] Japan .................. 2-13031
Apr. 4, 1990 [JP] Japan .................. 2-36669[U]

[51] Int. Cl.[5] ............................................ H01L 41/08
[52] U.S. Cl. ............................................ 310/323
[58] Field of Search ............................ 310/323, 328

[56] References Cited
U.S. PATENT DOCUMENTS

| | | | |
|---|---|---|---|
| 4,484,099 | 11/1984 | Kawai et al. | 310/328 X |
| 4,495,432 | 1/1985 | Katsuma et al. | 310/328 |
| 4,562,373 | 12/1985 | Tokusima et al. | 310/323 X |
| 4,634,916 | 1/1987 | Okada et al. | 310/323 |
| 4,692,651 | 9/1987 | Hiramatsu et al. | 310/323 |
| 4,752,711 | 6/1988 | Tsukimoto et al. | 310/323 |
| 4,871,937 | 10/1989 | Kawai | 310/323 |

FOREIGN PATENT DOCUMENTS

| | | | |
|---|---|---|---|
| 61-203872 | 9/1986 | Japan | 310/323 |
| 0224680 | 9/1988 | Japan | 310/323 |

Primary Examiner—Mark O. Budd
Attorney, Agent, or Firm—Bruce L. Adams; Van C. Wilks

[57] ABSTRACT

An ultrasonic motor utilizing flexural travelling wave components. A ball bearing is constituted by the inner ring, the balls, and an outer ring provided with a groove similar to the ball positioning groove of the inner ring, at a position where the ball are interposed. A rotor is provided inside the amplifying projections which are formed in the vibration member. A coil spring is provided in order to bring the rotor and the projections of the vibration member into pressure contact with each other. A spring pressing seat having a groove for receiving the other end of the coil spring is fixed to the support pin, with the coil spring and the support pin centered. The coil spring receiving groove of the inner ring and the coil spring are positioned so as not to share the same vertical plane with the ball. In this manner the thickness of the ultrasonic motor can be reduced.

21 Claims, 5 Drawing Sheets 5,091,670

ULTRASONIC MOTOR

BACKGROUND OF THE INVENTION

This device relates to an ultrasonic motor.

A structure of conventional ultrasonic motors is shown in FIG. 7. A support 8 is provided with a vibrator portion 82 to which a piezoelectric element 31 is adhered. A rotor 4 equipped with a bearing 9 is rotatably supported by a shaft portion 81 formed in the support 8 and which has balls 44. A coil spring 5 for bringing a bending plate portion 83 of the support 8 into pressure contact with the rotor 4 is provided around the shaft portion 91 of the support 8 in such a manner as to share the same vertical plane with the bearing 9 and moreover, to come into pressure contact with it. The other end of the coil spring 5 is supported by a spring pressing seat 6.

According to the conventional device, the coil spring 5 and a ball receiving sheet of the ball bearing are coaxially arranged so that they share the same vertical plane with each other. Therefore, this structure has a disadvantage for reduction of the thickness of ultrasonic motors. Since a means for restricting the ball position is not provided in the rotor or the ball receiving plate of the ball bearing, the balls are free to move to displaced positions, making the pressing force by the coil spring likely to be unstable.

Since the bearing lower ring is fixed to the rotor, friction occurs in the balls of the bearing due to the rotation of the rotor, thereby rotating a bearing upper ring. Accordingly, the pressing spring is twisted, the pressing force varies, and the bearing upper ring and the support pin are worn out, making the rotation of the rotor unstable. Furthermore, the position of the bearing lower ring supported turnably, with the shaft portion of the support pin of the rotor centered, is positioned lower than the projections of the vibration member in the cross section. Therefore, creaks occur between the inner ring and the support pin because of the inclination of the rotor center portion in the pressing direction. As a result, noise results and the force of the coil spring cannot be transmitted sufficiently to the contact portion between the projections of the vibration member and the rotor.

On the other hand, in a conventional travelling wave motor using a bearing for supporting the rotation of a rotor, the rotor is mounted rotatably on a central shaft via the bearing, In such a motor, the quantity of wriggling of the bearing is small and not set to a specific level.

In a travelling wave motor, two kinds of alternating voltages of different phases are applied to a piezoelectric element adhered to a vibration member, to generate a flexural travelling wave in a vibration member in accordance with an expansion motion of the piezoelectric element and drive a rotor, which is engaged under pressure with the vibration member. The rotor is rotated by a frictional force in a direction opposite to the direction in which the travelling wave advances. The contacting condition of the vibration member 303 and a friction member 302 bonded to the rotor 301 is as shown in FIG. 6, where A is the direction of rotor 301 and B is that of travelling wave. Since the rotor is driven by a frictional force, it is ideally desirable that all of the ridges of the travelling wave uniformly contact the sliding surface of the friction member. However, concerning the piezoelectric element, it is impossible to generate a consistently regular travelling wave due to the irregular shape of the electrode patterns and the irregular polarization condition thereof. Also, concerning the sliding surface of the friction member, it is impossible for the contacting condition thereof to be consistently uniform due to the lack of the manufacturing accuracy. Accordingly, in order to obtain a motor of a higher efficiency, it is necessary that the motor have a means for reducing the irregularities referred to above. In a motor using a bearing for supporting the rotation of a rotor, the wriggling portions of the bearing work to absorb such irregularities. Therefore, when the quantity of wriggling or play of a bearing is extremely small, such irregularity cannot be absorbed, so that the contacting condition becomes uneven. This causes a slip to occur, and the performance of the motor to be diminished.

SUMMARY OF THE INVENTION

It is an object of the present invention to provide a structure which solves the problems described above, can reduce the thickness of an ultrasonic motor, can apply a consistently stable pressing force, can prevent the following rotation of a bearing upper ring due to the rotation of a bearing lower ring, can prevent thrust between an inner ring and a support pin due to creaks, and can provide a motor of a high efficiency.

In order to solve the problem described above, the present invention provides a support pin which is inserted into a support plate. A vibration member having a piezoelectric element adhered thereto is fixed to the support pin. Further, an inner ring having a groove for receiving a coil spring is rotatably fitted to the support pin. Balls are held by a ball positioning groove formed in the inner ring. A ball bearing is constituted by an outer ring having a groove, which is similar to the ball positioning groove formed in the inner ring, in a position spaced apart by the balls. A rotor is provided inside the amplifying projections which are formed in the vibration member. The rotor and the projections of the vibration member are brought into pressure contact with each other by a coil spring. There is provided a spring pressing seat having a groove for receiving the other end of the coil spring with the support pin centered. The coil spring is fixed to the support pin by a set screw through the spring support seat. The coil spring receiving groove of the inner ring and the coil spring are provided at positions where the balls of the ball bearings are positioned radially offset from and may be at least partially co-planar with the spring. A surface cut portion is formed at the upper part of the inner ring. An inner ring presser is fixed to the support pin by a set screw so as to prevent the following rotation of the inner ring due to the rotation of the outer ring. A protuberance is formed in either the inner ring or the support pin at the same level as the balls, so that creaks between the inner ring and the support pin due to the inclination of the rotor will hardly occur.

Accordingly, the inner ring with which the coil spring is in contact applies a stable pressing force to the rotor disposed in the outer ring.

The surface cut portion is formed at the upper part of the inner ring, and the inner ring presser is fixed to the support pin by the set screw. The inner ring does not rotate even when the ball rotates because of the rotation of the rotor through the outer ring fixed to the rotor, and friction occurs between the ball and the inner ring.

Therefore, it is possible to fix the coil spring at a predetermined position and to stabilize the pressing force. Furthermore, it is also possible to prevent wear of the inner ring and the support pin and to stabilize the rotation of the rotor. The protuberance is formed either on the inner ring or the support pin at the same level as the balls. According to this arrangement, even when there exists an inclination of the vibration member fitted to the support pin within the fitting tolerance, there is a safety margin of a tilt angle of the inner ring with respect to the support pin before creaks or frictional noise develop.

Furthermore, the present invention is constructed so that the quantity of wriggling of a bearing, which is used to support the rotation of a rotor, in the direction of the thrust thereof is larger than the quantity of amplitude of a travelling wave occurring in a vibration member, or larger than the largest of the quantity of amplitude of the same travelling wave and the quantity of waviness of a sliding surface of a friction member. The quantity of wriggling of a bearing in the direction of the thrust thereof mentioned above means a total quantity of vertical movement of the bearing occurring between the condition shown in FIG. 5(a), in which an outer ring 45 rises with respect to an inner ring 41 via balls 44, and the condition shown in FIG. 5(b), in which the outer ring 45 falls with respect to the inner ring 41 via the balls 44.

When the quantity of wriggling of the bearing, which is used to support the rotation of the rotor, in the direction of the thrust thereof is set larger than the quantity of amplitude of a travelling wave occurring in the vibration member, the degree of freedom of vertical movement of the rotor increases. Accordingly, even when the travelling wave becomes uneven, the rotor is automatically driven so as to attain the most stable contacting condition. When the quantity of wriggling of the bearing in the direction of the thrust thereof is set larger than the quantity of waviness of the sliding surface of the friction member, the degree of freedom of vertical movement of the rotor increases. This can prevent the partial contacting of the contact surface with respect to the vibration member and enables the uniform contacting condition of the contact surface to be obtained.

DETAILED DESCRIPTION OF THE PREFERRED EMBODIMENT

Hereinafter, an embodiment of the present invention will be explained with reference to the drawings.

Figure 1:
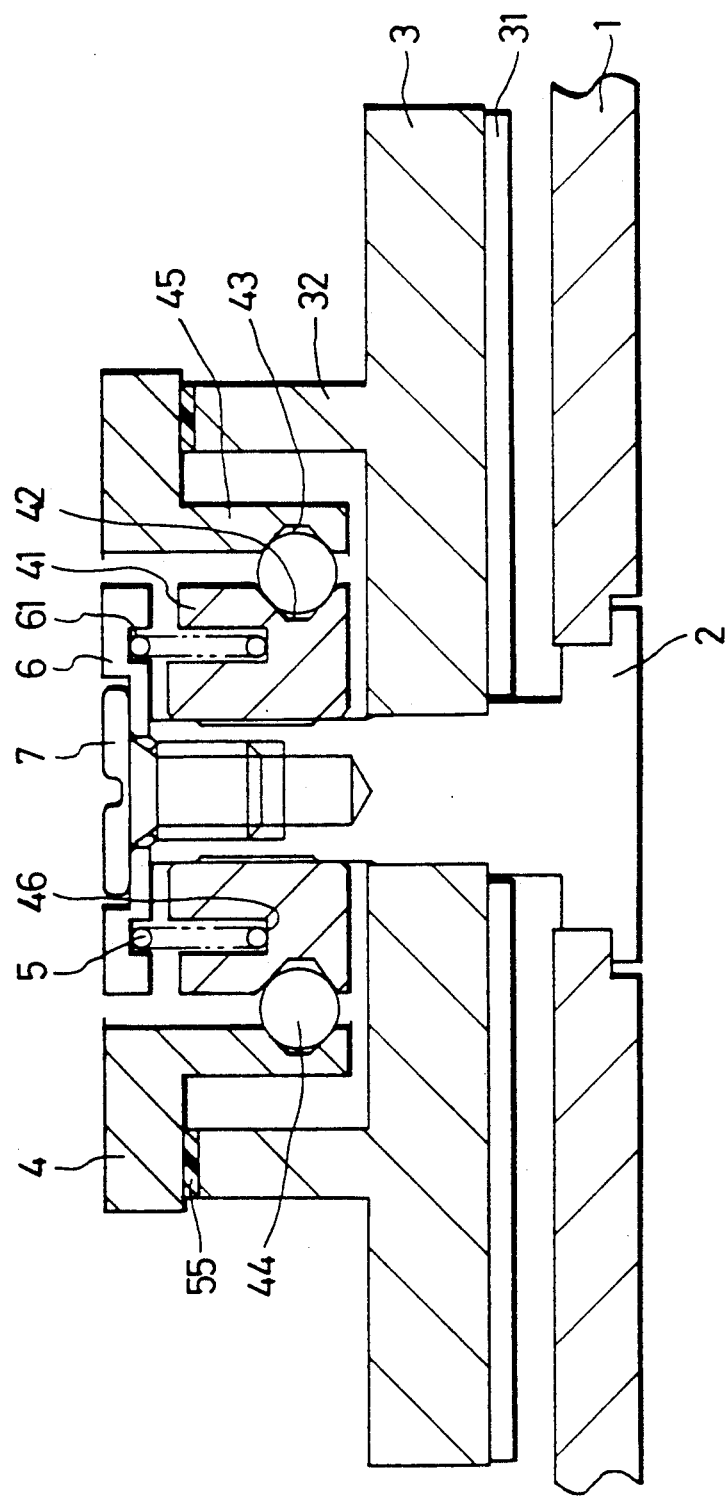
FIGS. 1, 2, 3 and 4 are sectional views, each showing a different embodiment of the present invention.

In FIG. 1, a support pin 2 is fixed to a support plate 1. A vibration member 3 having a piezoelectric element 31 adhered thereto is fixed to the support pin 2. An inner ring 41 having a coil spring receiving groove 46 for receiving a coil spring 5 is fitted rotatably to the support pin 2. Balls 44 are held inside a ball positioning groove A 42 formed in the inner ring 41. Another ball positioning groove B 43 which is substantially the same as the ball positioning groove A 42 is formed in an outer ring 45 at a position where the ball 44 are interposed between them.

Figure 2:
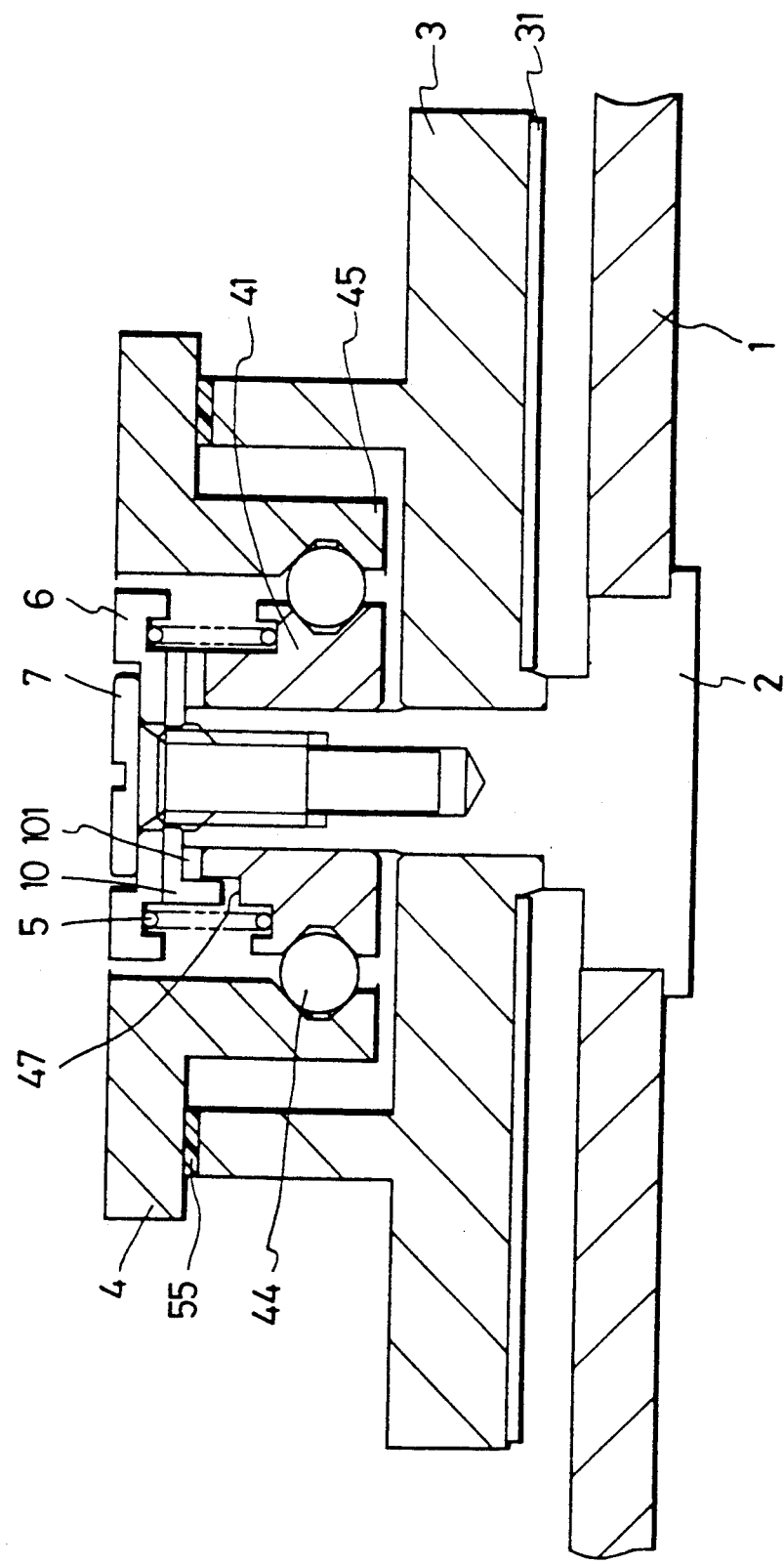
Figure 3:
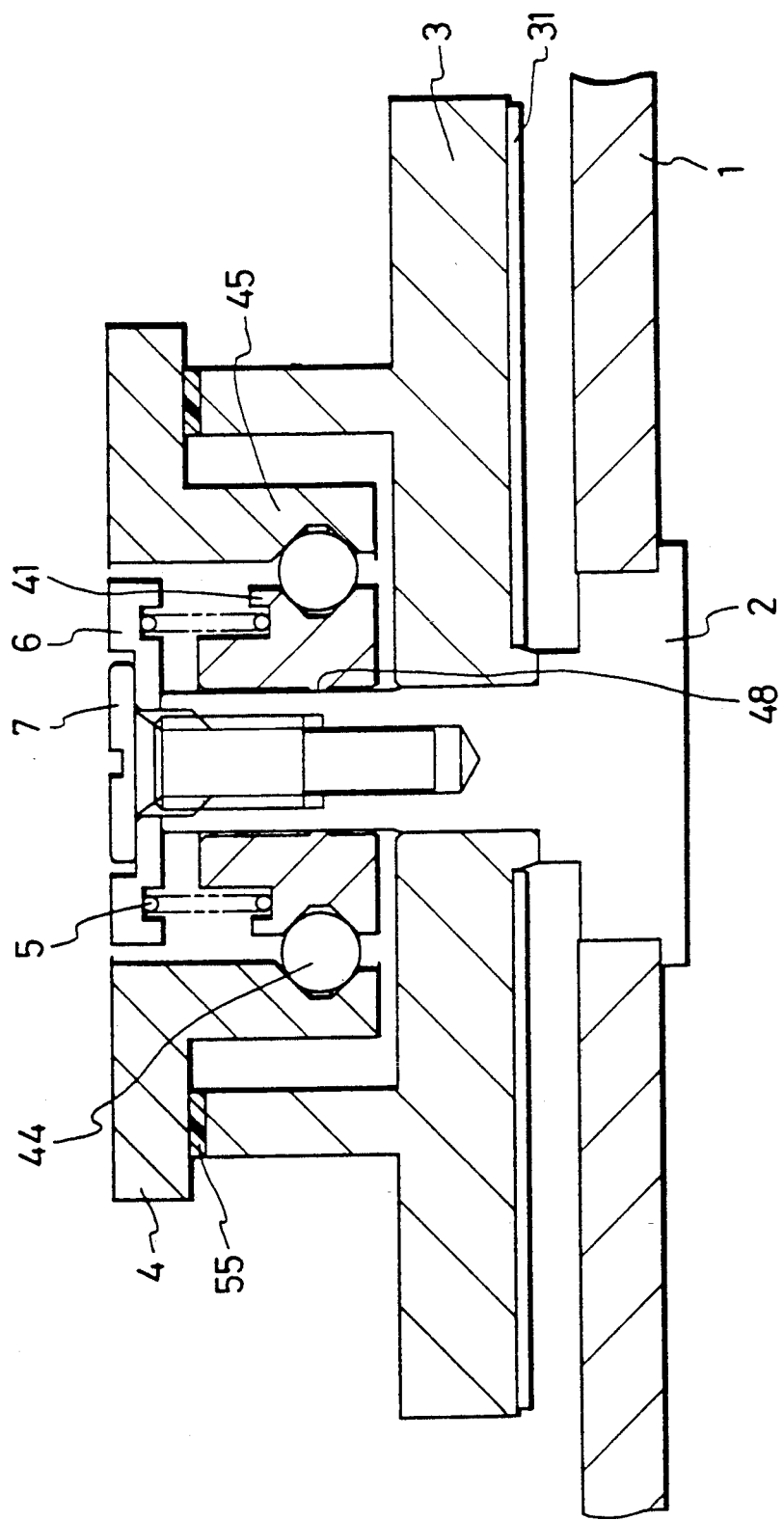
Figure 4:
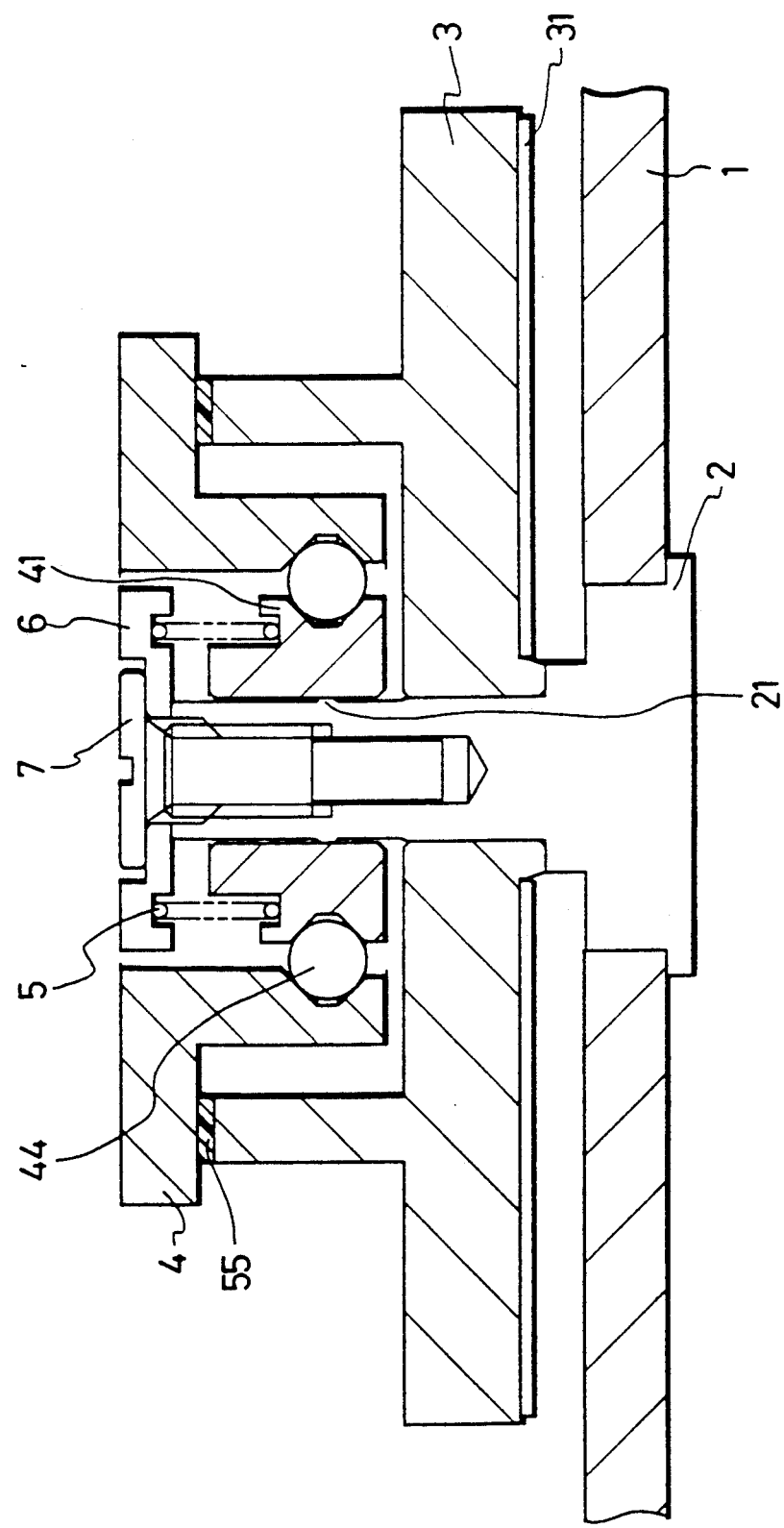
Figure 5A:
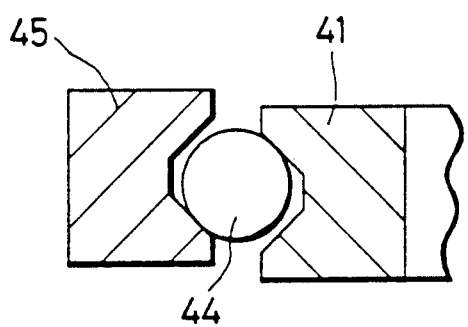
FIG. 5 is a sectional view showing the quantity of wriggling of a bearing in the present invention.
Figure 5B:
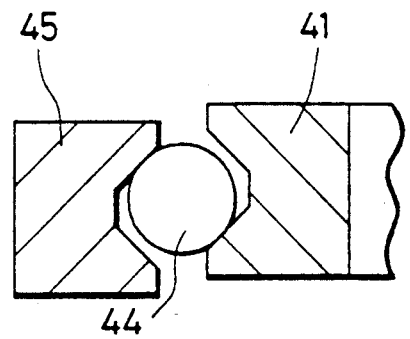
Figure 6:
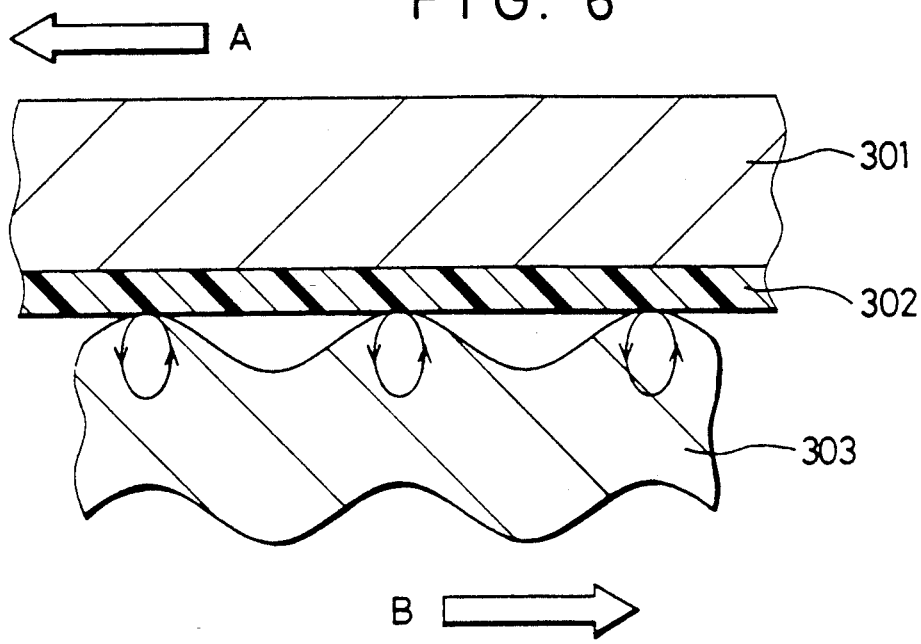
FIG. 6 is a sectional view showing the contacting condition of a friction member and a vibration member in the travelling wave motor according to the present invention.
Figure 7:
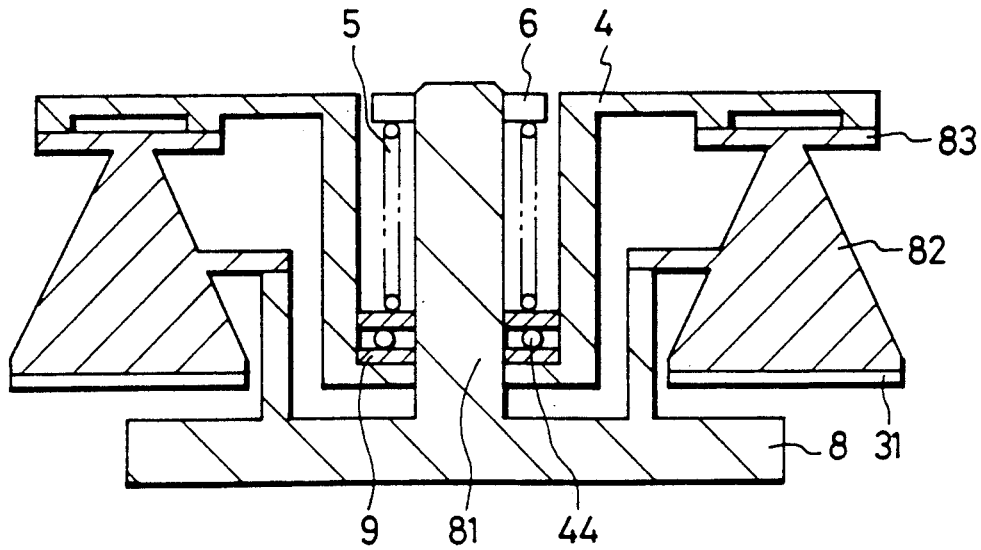
FIG. 7 is a sectional view showing an example of prior art.

A ball bearing comprises the inner ring 41, the balls 44 and the outer ring 45. A rotor 4 is provided inside projections 32 for displacement expansion which is formed in the vibration member 3. The rotor 4 and the projections 32 of the vibration member 3 are brought into pressure contact with each other by the coil spring 5. This coil spring 5 is supported by a spring pressing seat 6 having a groove 61 for receiving the other end of the coil spring 5, with the support pin 2 centered and is fixed to the support pin 2 by a set screw 7. The coil spring receiving groove 46 of the inner ring 41 and the coil spring 5 are disposed at positions where they do not share the same vertical plane with the balls 44. FIG. 2 is a sectional view showing another embodiment of the present device, and a surface cut portion 47 is formed at the outer peripheral portion of the inner ring 41. An inner ring presser 10 is fitted between the support pin 2 and the spring pressing seat 6 in such a manner that the surface cut portion 47 of the inner ring 41 meshes with a recessed slit 101 of the inner ring presser 10. The inner ring presser 10 is fixed by the set screw 7 and restricts the rotation of the inner ring 41 caused by the rotation of the outer ring 45. FIGS. 3 and 4 are sectional views, each showing still another embodiment of the present device. Belt-like protuberance 48 or 21 is provided either inside the hole of the inner ring 41 or at the outer periphery of the support pin 2 at the position of the same level of the balls 44.

According to this structure, even when the inner ring 41 inclines to the ball 44, the variation of inclination is small because the belt width of the protuberance 48 or 21 existing on the sliding portion between the support pin 2 and the inner ring 41 becomes small. Accordingly, few creaks between the support pin 2 and the inner ring 41 occur.

In accordance with the present invention described above, the ball bearing is supported by the spring pressing seat through the coil spring and is fixed to the support pin by the set screw. Since the coil spring receiving groove of the inner ring and the coil spring are disposed at the positions where they do not share the same vertical plane with the balls, the inner ring in contact with the coil spring supports the rotor which is provided on the outer ring through the balls. Therefore a stable pressing force can be applied to the rotor. Since the balls and the coil spring are provided at the positions where they do not share the same vertical plane, the thickness of the ultrasonic motor can be reduced simultaneously. Furthermore, since the surface cut portion is formed on the upper part of the inner ring and the inner ring presser is fixed to the support pin by the set screw, the following rotation of the inner ring because of the rotation of the outer ring can be prevented. The stable pressing force can be obtained between the rotor and the vibration member. Further, wear of the inner ring and the support pin can be prevented and the rotation of the rotor can be stabilized. Since the protuberance is disposed either on the inner ring or the support pin at the same level of the balls, creaks between the inner ring and the support pin due to the inclination of the rotor hardly occurs and the pressing force can be stabilized.

A motor in which the outer diameter of the vibrator was 10 [mm] was practically produced. In this motor, the amplitude of the vibration of the vibration member in a no-load condition was around 1-2 [μ] and the waviness of the friction member around 5-10 [μ]. Experiments were conducted with this motor by varying the quantity of wriggling of the bearing in many ways to find out that, when the quantity of wriggling of the bearing was not more than 10 [μ], the rotating performance of the motor was inferior. It was also found out that the sliding sound was large, and that a slip occurred. Accordingly, it is desirable that the quantity of wriggling of the bearing be larger than that of waviness of the friction member.

As described above, the present invention in which the quantity of wriggling of the bearing in the direction of the thrust thereof is set larger than the quantity of amplitude of a travelling wave occurring in the vibration member, or larger than the largest of the quantity of amplitude of the same travelling wave and the quantity of waviness of the sliding surface of the friction member, whereby the degree of freedom of the vertical movement of the rotor increases to enable the irregularities of the dimensions of the vibration member and friction member to be absorbed, a stable contacting condition of these parts can be obtained, and a travelling wave motor of a high efficiency can be provided.

What is claimed is:

1. An ultrasonic motor utilizing flexural travelling waves generated in a vibration member for rotating a rotor comprising:
   fixture means for fixing said ultrasonic motor to a supporting means;
   a vibration member having amplifying projections for generating travelling waves;
   a piezoelectric element adhered to said vibration member;
   a rotor rotatably disposed in frictional contact with the amplifying projections of said vibration member;
   a pressure-regulator including a coil spring for generating suitable contact pressure between said rotor and said vibration member; and
   a ball bearing positioned inside of said amplifying projections, the ball bearing comprising an inner ring rotatably supported by said supporting means and having a groove for receiving said coil spring, an outer ring fixed to said rotor, and balls provided between said inner ring and said outer ring.

2. An ultrasonic motor as claimed in claim 1, further comprising a spring pressing means for receiving said coil spring.

3. An ultrasonic motor as claimed in claim 1, wherein said groove of said inner ring and said coil spring are positioned so as not to share the same vertical plane with said balls.

4. An ultrasonic motor as claimed in claim 1, including rotation preventing means for preventing a following rotation of said inner ring due to the rotation of said outer ring.

5. An ultrasonic motor as claimed in claim 1 wherein the quantity of wriggling in the direction of the thrust of said ball bearing is larger than the quantity of amplitude of a travelling wave occurring in said vibration member.

6. An ultrasonic motor as claimed in claim 1, further comprising a friction means fixed to said movable member for contacting to said rotor.

7. An ultrasonic motor as claimed in claim 6 wherein the quantity of wriggling in the direction of the thrust of said ball bearing is larger than the quantity of waviness of the sliding surface of said friction means.

8. An ultrasonic motor as claimed in claim 7 wherein said quantity of wriggling in the direction of the thrust of said ball bearing is larger than the larger quantity of that of amplitude of said travelling wave and that of waviness of the sliding surface of said friction means.

9. An ultrasonic motor comprising: a support pin; vibrating means disposed annularly around said support pin for generating vibrational drive waves; a rotor disposed annularly around said support pin and rotatably supported by and in frictional contact with said vibrating means; bearing means including an inner ring member axially slidably engaged with said support pin, an outer ring member intergrally connected with said rotor and positioned between said vibrating means and said inner ring member, and a plurality of balls disposed between and rotatably supported by said inner and outer ring members; and pressure regulating means for applying a pressing force to said inner ring to thereby apply the pressing force to said rotor to press said rotor into frictional contact with said vibrating means through said bearing means.

10. An ultrasonic motor according to claim 9, wherein said vibrating means has a set of vibration projection members in frictional contact with said rotor; said outer ring member is disposed between the vibration projection members and said support pin and has a first groove; said inner ring member has a second groove opposed to said first groove and is positioned around said support pin with said plurality of balls being disposed within said first and second grooves; and said pressure regulating means includes a coil spring positioned around said support pin and in pressing contact with said inner ring to apply the pressing force to said rotor through said plurality of balls.

11. An ultrasonic motor according to claim 10; further comprising means for maintaining a gap between said inner ring and said support pin.

12. An ultrasonic motor according to claim 11; wherein said means for maintaining a gap comprises a protuberance integral with said inner ring.

13. An ultrasonic motor according to claim 11; wherein said means for maintaining a gap comprises a protuberance integral with said support pin.

14. An ultrasonic motor according to claim 10; further comprising rotation restricting means for restricting the rotation of said inner ring member about said support pin.

15. An ultrasonic motor according to claim 10; wherein said pressure regulating means includes means for varying the pressing force of the coil spring.

16. An ultrasonic motor according to claim 9; wherein said pressure regulating means includes a coil spring positioned around said support pin; and said plurality of balls are positioned radially off-set from said coil spring.

17. An ultrasonic motor according to claim 16; wherein said plurality of balls are positioned at least partially co-planar with said coil spring.

18. An ultrasonic motor according to claim 16; further comprising rotation restricting means for restricting the rotation of said inner ring member about said support pin.

19. An ultrasonic motor according to claim 16; wherein said pressure regulating means includes means for varying the pressing force of the coil spring.

20. An ultrasonic motor according to claim 9; wherein said bearing means has a degree of play which is larger than that of the amplitude of the vibrational drive waves.

21. An ultrasonic motor according to claim 9; wherein said bearing means has a degree of play which is larger than that of surface irregularities of contact surfaces between said rotor and said vibrating means.

* * * * *